United States Patent Office 2,956,939
Patented Oct. 18, 1960

2,956,939

PROCESS OF PREPARING STABLE POLYMERS AND THE RESULTANT PRODUCT

Harry D. Anspon, Easton, Pa., assignor to General Aniline & Film Corporation, New York, N.Y., a corporation of Delaware No Drawing. Filed Apr. 18, 1958, Ser. No. 729,261

5 Claims. (Cl. 204—158)

This invention relates to improvements in the preparation of mass polymers of methyl α-fluoroacrylate and in the resulting polymer mass, and specifically, it relates to improvements whereby outstandingly light stable products are produced.

The esters of α-fluoroacrylic acid and in particular, methyl α-fluoroacrylate, have become increasingly important base materials useful in the manufacture of polymers, which polymers are possessed of outstanding, unusual and unexpected properties. Among the various properties of methyl α-fluoroacrylate polymers are those outstanding physical characteristics of high heat stability, high flexural and tensile strengths, excellent craze resistance, low notch sensitivity, toughness, unique self-extinguishing properties in burning tests, and complete formability which make this polymer particularly suited for use as glazing material and especially, for the glazing of high speed and supersonic aircraft. In order to achieve the optimum with respect to the above described characteristics, it is necessary that the monomer from which the mass polymer is to be produced be in an exceptional state of purity and, additionally, this monomer must be handled with extreme care in all phases of its preparation and its subsequent polymerization. Notwithstanding all of the necessary precautions which one might take and the utilization of a monomer of superior purity, mass polymers produced thereby when polymerized in the manner of the prior art and in the manners heretofore known, while yielding a product which is generally acceptable with respect to most of the above discussed characteristics, often fail to yield a product which is satisfactory from the point of view of light stability and heat distortion characteristics. Since the major contemplated use of the subject polymer is as a glazing material in aircraft, it is manifestly of utmost importance that such material exhibit no yellowing upon exposure to light and other weathering influences since, obviously, development of yellow coloration reduces the visibility therethrough to an undesirable degree and cannot be tolerated in high speed aviation. It is of course well known that most if not all organo plastic materials which could be employed as a glazing material exhibit some deterioration upon exposure to light and other weathering influences and other actinic radiations, and there is a constant need and search, therefore, for materials which will exhibit this characteristic to an absolute minimum. I have discovered that methyl α-fluoroacrylate polymer can be prepared whereby it is considered satisfactory from the point of view of not developing any yellow color formation and consequent reduction in the luminous transmittance by incident radiation.

It is equally important for the above described glazing use that the polymer have a sufficiently high distortion temperature so as not to exhibit deformation or flow characteristics during the use thereof. I have discovered that methyl α-fluoroacrylate polymer can be prepared having improved and acceptable heat distortion characteristics.

It is therefore an object of the present invention to provide a process whereby light stable mass polymers of methyl α-fluoroacrylate may be produced.

It is another object of my invention to provide a process whereby methyl α-fluoroacrylate polymeric material may be produced which is resistant to the formation of yellow color bodies upon exposure to weathering influences.

It is a still further object of this invention to provide a mass polymer of methyl α-fluoroacrylate which is light stable and which does not to any substantial degree form a yellow coloration upon extended exposure to light and other weathering influences.

It is still another object of this invention to provide a process whereby mass polymers of methyl α-fluoroacrylate having improved heat distortion characteristics may be produced.

Other objects will appear hereinafter as the description proceeds.

The objects of this invention are achieved by carrying out the final stages of the polymerization of the monomeric methyl α-fluoroacrylate at temperatures considerably higher than those heretofore employed for such final polymerization steps. It was particularly unexpected that an improved product would result from such a technique in the light of the known characteristics of this polymer to be susceptible at elevated temperatures to color body formation. In contradistinction to the expected formation of a yellow coloration as a result of an elevated temperature polymerization in the final stages thereof, it has been found that not only is the resulting mass polymer satisfactory in so far as all of the other properties mentioned above, but furthermore, there is no degradation resulting in heat-produced color formation and finally, there is an outstanding and substantial increase in the light stability of the resultant mass polymer. In addition to such outstanding advantages in the instant process, I have also found, quite unexpectedly, that the heat distortion temperature of the polymer when prepared in accordance with the present invention, is increased. It has heretofore been common practice in the preparation of mass polymers of methyl α-fluoroacrylate to conduct the polymerization process in a stepwise manner. This is occasioned by the fact that the monomer undergoes substantial shrinkage during the initial polymerization steps and unless this is done, firstly, at or near room temperatures, and then at slightly elevated temperatures, secondly, a satisfactory product cannot be obtained, that is, satisfactory at least from the point of view of preparing a suitable optically satisfactory surface. After the initial polymerization step whereby a very viscous liquid or gel is produced, continued polymerization is then conducted at somewhat elevated temperatures resulting in the formation of a solid. Substantial shrinkage occurs during this phase of the polymerization, too, and again, careful control of the temperature must be maintained to prevent "run away" of the reaction. The final step in the polymerization process has heretofore involved a "curing" of the polymer at temperatures of from about 80 to 120° C., it having been considered undesirable to employ greater temperatures due to the expectation that such higher temperatures would result in color body formation and bubbling. It has been generally recognized in this art that the final polymerization temperatures should be in the neighborhood of the boiling point of the monomeric material which, in the case of methyl α-fluoroacrylate, is about 92° C. It was completely unforeseen that by employing substantially higher temperatures in the final phases of polymerization, there would result a polymeric material which has substantially greater light stability than similar polymers employing final polymerization temperatures of the order of 120° C. Specifically, I have discovered that the final stages of polymerization of methyl α-fluoroacrylate in the preparation of mass polymers thereof should be conducted at temperatures from about 170° C. to about 220° C. and that when the process is so carried out, there results a product which exhibits no significant color formation and no reduction in luminous transmittance even after 500 hours exposure in an Atlas Fadeometer deemed to be the equivalent of 6 months exposure in south Florida. The preferred temperature is from 180 to 200° C. In contrast to this, polymers produced in the manner of the prior art, after such testing, were found to have developed substantial yellow coloration and a loss of transmittance of from 5 to 15%, which loss is considered to be extremely high in the range of transmittances dealt with.

The following examples will serve to illustrate the present invention without being deemed limitative thereof.

*Example 1*

1000 g. of methyl α-fluoroacrylate monomer which had been vacuum distilled and which is characterized by a freezing point of −42.24° C., indicating a substantially pure monomer, is polymerized in a mold comprising glass plates spaced apart so as to yield a polymer sheet of 0.35 in. thickness. The mold is permitted to stand at room temperature in diffused daylight for 8 hrs. after which it is then heated for 3½ hrs. at 60° C. and 12 hrs. at 100° C. The mold is then permitted to cool to room temperature and the resultant sheet removed therefrom. The product is a colorless and apparently satisfactory sheet. The luminous transmittance of the sheet so obtained as measured on a General Electric recording spectrophotometer is found to be 93.1%. After exposure for 50 hrs. in a modified weatherometer, yellow color formation has occurred and the transmittance at this time when measured in the same manner as above is found to be 87.2%.

*Example 2*

The procedure of Example 1 is repeated except that after the heating cycle of 12 hrs. at 100° C. the mold is further subjected to a heat treatment for 3 hrs. at 190° C. After cooling, this sheet is removed and appears to be substantially identical upon visual inspection as the sheet of Example 1. The luminous transmittance is the same as Example 1 before exposure. After exposure for 240 hrs. in the weatherometer employed in Example 1, the transmittance is found to be 93.0%. Visual inspection fails to detect any noticeable coloration in the sheet.

*Example 3*

Example 1 is repeated except that after filling, the mold is irradiated with a battery of twelve 40-watt Westinghouse fluorescent daylight lamps (6 lamps 12 in. away on either side of the mold) for 20 hrs. The mold is then placed in an air oven and subjected to a heat treatment for 4 hrs. at 180° C. The resultant product, after cooling and removal from the mold, is a colorless sheet of acceptable physical characteristics. The luminous transmittance of the sheet as measured in Example 1, is 93.0%. After exposure for 300 hrs. in the weatherometer used in that example, the transmittance is found to be 92.8%. There is no evidence of any colors in the sheet, even when viewed edgewise.

*Example 4*

The procedure of Example 3 is repeated except that the temperature of the air oven is reduced to 120° C. and the curing time is 20 hrs. After 200 hrs. exposure in the weatherometer, the transmittance drops from 93% to 85% and there is a distinct and noticeable yellow coloration.

*Example 5*

Example 2 is repeated except that the final heating step is carried out at 170° C. for 6 hrs. The luminous transmittance of the polymeric product is 93.2%. The heat distortion temperature is 119° C. This compares with a heat distortion temperature of 108° C. of the product of Example 1. The heat distortion temperature is measured as set forth in ASTM D 648–45T "Tentative Method of Test for Heat Distortion on Plastics," ASTM Standards on Plastics, pages 532–534 (May, 1954).

*Example 6*

Example 3 is repeated except that the final step of heating is carried out for 5½ hrs. at 170° C. The heat distortion temperature of the polymer so produced is 119.2° C. and the luminous transmittance thereof 93.1%.

*Example 7*

Example 3 is again repeated except that the final step of heating is carried out at 200° C. for 2½ hrs. The heat distortion temperature of this polymeric product is 121° C. and the luminous transmittance 93.0%.

*Example 8*

The product of Examples 5 through 7 are exposed for 300 hrs. in the weatherometer described in Example 1. After this exposure there is no evidence of any coloration in the sheets and the transmittance in each instance is between 92.8 and 93.0%.

*Example 9*

Example 1 is once again repeated except that the final heating step is carried out at 190° C. for 10 hrs. The polymer sheet so produced is colorless, has a luminous transmittance of 93.1%, and a heat distortion temperature of 122.5° C.

*Example 10*

Example 3 is repeated except that the final step of heating is carried out at 220° C. for 3 hrs. The heat distortion temperature of this polymer sheet is 124° C.

*Example 11*

The procedure of Example 10 is once again repeated except that the final heating step is carried out for 30 hrs. The heat distortion temperature of this product is 124.5° C. The sheet is colorless and has a luminous transmittance of 93.0%.

*Example 12*

Example 10 is once again repeated except that the final heating at 220° C. is carried out for 48 hrs. The heat distortion temperature of this product is 124.5° C. The sheet is colorless and has excellent light stability.

Other variations in and modifications of the described processes which will be obvious to those skilled in the art can be made in this invention without departing from the scope or spirit thereof.

I claim:

1. A method for the mass polymerization of methyl α-fluoroacrylate which comprises partially polymerizing said monomer at about room temperature in the presence of actinic radiation for about 8 hrs., continuing the polymerization process at a temperature of about 100° C. for 12 hrs. and completing polymerization at a temperature of about 190° C. for about 3 hrs.

2. A method for the mass polymerization of methyl

α-fluoroacrylate which comprises partially polymerizing the monomer by exposure to ultraviolet radiation at about room temperature for about 20 hrs. and thereafter completing the polymerization at a temperature of from about 180° C. to about 200° C.

3. A method for the mass polymerization of methyl α-fluoroacrylate which comprises partially polymerizing the monomer by exposure to ultra-violet radiation at about room temperature for about 20 hrs. and thereafter completing the polymerization at a temperature of about 180° C. for about 4 hrs.

4. Methyl α-fluoroacrylate polymer produced in accordance with the method of claim 1.

5. Methyl α-fluoroacrylate polymer produced in accordance with the method of claim 2.

References Cited in the file of this patent

UNITED STATES PATENTS

| | | |
|---|---|---|
| 1,891,203 | Ambros et al. | Dec. 13, 1932 |
| 2,273,891 | Pollack et al. | Feb. 24, 1942 |
| 2,683,704 | Anspon | July 13, 1954 |